(12) United States Patent
Triggs et al.

(10) Patent No.: US 9,627,876 B2
(45) Date of Patent: Apr. 18, 2017

(54) INSULATED SPLITTERS AND RELATED METHODS

(71) Applicant: Radio Frequency Systems, Inc., Meriden, CT (US)

(72) Inventors: Robert Triggs, Middletown, CT (US); Nicholas A. DeLuca, Stratford, CT (US)

(73) Assignee: Alcatel-Lucent Shanghai Bell Co., Ltd, Shanghai (CN)

( * ) Notice: Subject to any disclaimer, the term of this patent is extended or adjusted under 35 U.S.C. 154(b) by 1 day.

(21) Appl. No.: 14/664,274

(22) Filed: Mar. 20, 2015

(65) Prior Publication Data

US 2016/0276814 A1  Sep. 22, 2016

(51) Int. Cl.
 H02G 3/04 (2006.01)
 H02G 1/08 (2006.01)
 H02G 15/04 (2006.01)

(52) U.S. Cl.
 CPC ................................. H02G 15/046 (2013.01)

(58) Field of Classification Search
 CPC .................................. H02G 3/04; H02G 1/08
 USPC ........................................ 174/72 R; 29/825
 See application file for complete search history.

(56) References Cited

U.S. PATENT DOCUMENTS

| | | | | |
|---|---|---|---|---|
| 2,414,498 A | * | 1/1947 | Baldwin | H02G 15/10 |
| | | | | 156/49 |
| 3,028,543 A | * | 4/1962 | Parmater | F02P 17/00 |
| | | | | 324/114 |
| 3,001,003 A | | 8/1964 | Robinson | |
| 3,144,506 A | | 8/1964 | Gunthel, Jr. | |
| 6,960,722 B2 | | 11/2005 | Frederick et al. | |
| 9,087,629 B2 | * | 7/2015 | Bates | H01B 7/295 |
| 9,201,205 B2 | * | 12/2015 | Bunte | G02B 6/44 |
| 2004/0154829 A1 | * | 8/2004 | Sass | H01B 7/0018 |
| | | | | 174/257 |
| 2011/0008993 A1 | * | 1/2011 | Adachi | H02G 3/26 |
| | | | | 439/382 |
| 2011/0308857 A1 | | 12/2011 | Zapata | |
| 2013/0048366 A1 | | 2/2013 | ONeill | |
| 2015/0055944 A1 | * | 2/2015 | Van Straten | H05B 3/16 |
| | | | | 392/426 |
| 2015/0207276 A1 | * | 7/2015 | Giangrande | H01R 13/73 |
| | | | | 439/575 |

* cited by examiner

*Primary Examiner* — Timothy Thompson
*Assistant Examiner* — Charles Pizzuto
(74) *Attorney, Agent, or Firm* — The Capitol Patent & Trademark Law Firm, PLLC

(57) ABSTRACT

Conductors within a multi-conductor electrical cable can be safely and separately connected using a splitter that incorporates smooth and chamfered openings and surfaces, and at least one elongated (e.g., tubular) passageway for covering an uninsulated conductor.

16 Claims, 4 Drawing Sheets

INSULATED SPLITTERS AND RELATED METHODS

INTRODUCTION

Typically, hundreds of feet of cabling are used to connect various elements of a wireless base station. For example, many times electronic equipment on the ground must be connected to electronic equipment and antennas on top of an antenna tower using a cable. Many times the cable consists of many internal electrical conductors. Further, at each end it may be necessary to separate the internal conductors and separately connect one or more of the internal conductors to different devices, chasses, junction boxes, device ports, inputs, etc., located at different locations, (collectively referred to as "locations").

To satisfactorily connect internal conductors can be challenging. For example, sometimes the locations where internal conductors from the same cable need to be connected are not next to one another. Thus, to connect one internal conductor to one location and a second internal conductor to a second location typically requires the conductors to be separated and often results in conductors of differing lengths. Further, one internal conductor may need to be stripped of its protective outer insulation in order to make a connection using a bare conductor. Thereafter, the bare conductor is typically wrapped in insulating tape (referred to as "wrapping" for short). Wrapping is necessary for safety reasons. Left unwrapped, a bare conductor may contact another location or another conductor causing an electrical short circuit. Further, if an unwrapped conductor makes contact with another uninsulated location electricity from the unwrapped conductors may inadvertently flow to other locations causing damage to a device. Further, if personnel responsible for maintaining and repairing a device containing or contacting the unwrapped conductor should come in contact with the device they may be electrically shocked due to the unwanted flow of electricity. Yet further, such personnel may come in direct contact with an unwrapped conductor and be harmed as well.

Wrapping or other means of insulating conductors has its disadvantages, one of which is that wrapping can be time consuming. Further, while most personnel are well trained in the process of wrapping bare conductors, nonetheless, the level of skill varies and thus, so does the level of protection afforded by wrapping.

SUMMARY

Exemplary embodiments of devices and related methods for protecting electrical conductors are described herein.

According to one embodiment, a device for protecting electrical conductors may comprise a main insulated passageway comprising an undivided chamber and an opening to allow passage of a main, elongated medium comprising at least two internal, secondary elongated conductive media, and at least two, separated secondary insulated passageways, where at least one of the secondary passageways is configured as an elongated passageway, and each of the secondary passageways forms a separate, unitary passageway with the chamber to allow passage of at least one of the secondary conductive media.

In one embodiment the device may comprise an insulated splitter, the main medium may comprise a low inductance, multi-conductor direct current (DC) power cable and the secondary conductive media may comprise copper conductors, for example. Yet further, the device may comprise a reusable splitter.

Exemplary devices may comprise only one secondary passageway that is configured as an elongated passageway, or more than one passageway may be so configured.

Further, a secondary passageway configured as an elongated passageway may be further configured to form a separate, unitary passageway with the chamber to allow passage of at least one uninsulated secondary, elongated conductive medium. Other secondary passageways that are not configured as elongated passageways may, nonetheless, be configured to form separate, unitary passageways with the chamber to allow passage of at least one insulated secondary, elongated conductive medium. The elongated passageways may be shaped as tubular passageways, for example. Yet further, the cross sectional shape of an elongated passageway may be square, rectangular or oval, for example.

Similarly, another embodiment of a device for protecting electrical conductors may comprise a main insulated passageway comprising an undivided chamber and an opening to allow passage of a cable comprising at least two conductors, and two separated, secondary insulated passageways, where one of the secondary passageways is configured as an elongated passageway, and each of the secondary passageways forms a separate, unitary passageway with the chamber to allow passage of at least one of the conductors.

As before, this alternative device may comprise a reusable, insulated splitter, the cable may comprise a low inductance, multi-conductor DC power cable and the two conductors may comprise copper conductors, for example.

Still further, the secondary passageway that is configured as an elongated passageway may be further configured to form a separate, unitary passageway with the chamber to allow passage of an uninsulated conductor, while another secondary passageway may be configured to form a separate, unitary (and not elongated, for example) passageway with the chamber to allow passage of an insulated conductor.

In addition to devices, the present invention provides related methods for protecting electrical conductors. In one embodiment, an exemplary method for protecting electrical conductors may comprise: (i) inserting a main, elongated medium into a main insulated passageway of a splitter comprising an undivided chamber and an opening, the main elongated medium comprising at least two internal, secondary elongated conductive media, and (ii) separating the at least two internal secondary elongated conductive media, at least one of the separated secondary elongated conductive media passing through the undivided chamber and into a secondary insulated passageway configured as an elongated passageway of the splitter, and at least one of the separated secondary elongated conductive media passing through the undivided chamber and into another secondary insulated (and not elongated, for example) passageway of the splitter.

Such an exemplary method may further comprise removing insulation from around one of the secondary conductive media, inserting the separated secondary conductive media into the main passageway, and passing the secondary conductive medium with its insulation removed through the undivided chamber and into the secondary passageway configured as the elongated passageway.

Yet further, such an exemplary method may additional comprise trimming one or more of the passageways to a desired length, for example.

As with the exemplary devices described above, exemplary methods provided by the present invention may use a low inductance, multi-conductor DC power cable as the main medium and copper conductors as the secondary conductive media, where one of the secondary conductive media comprises an uninsulated conductive medium and another comprises an insulated conductive medium, for example.

Additional embodiments and features will be apparent from the following detailed description and appended drawings.

DETAILED DESCRIPTION, WITH EXAMPLES

Exemplary embodiments of devices for protecting electrical conductors and related methods are described herein and are shown by way of example in the figures. Throughout the following description and figures, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be understood that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise. It should be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, and/or groups thereof.

When used to describe the insulation of an electrical conductor, the words "covering" and "protecting" and their tenses may be used interchangeably herein unless the context or common sense dictates otherwise.

The word "diameter" means a latitudinal or longitudinal diameter while "diameters" means either latitudinal and/or longitudinal diameters.

As used herein, the term "embodiment" refers to an example of the present invention.

Figure 1:
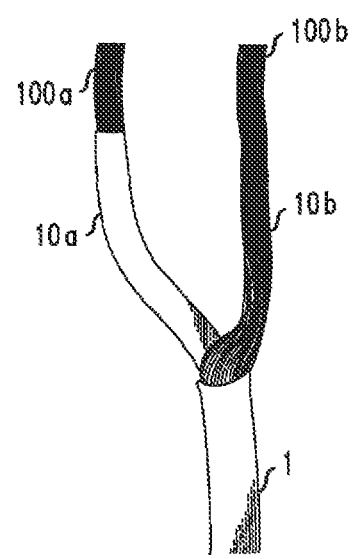
FIG. 1 depicts a cable and two internal electrical conductors.

Turning to FIG. 1, there is depicted an elongated medium 1 and two internal, secondary elongated conductive media 10a, 10b that have been separated. For purposes of the following discussion, medium 1 may be referred to as a "main medium" or simply as a "cable" while media 10a, 10b may be referred to "secondary conductive media" or "secondary conductors". In one embodiment, the main medium 1 may comprise a low inductance, multi-conductor, DC power cable, for example, that includes two internal secondary conductors 10a, 10b. Prior to separation, the secondary conductors 10a, 10b may be originally concentrically located inside main medium 1, and may comprise copper wire, either solid or stranded copper wire, for example, (e.g., 4, 6 or 8 gauge wire) though it should be understood that the secondary conductors 10a, 10b may be made from other conductive material, such as aluminum and may be any gauge required by a particular application. While the gauge of the secondary conductors may affect the size and dimensions of the inventive devices described herein (see FIGS. 2a through 5) the size and dimensions do not otherwise affect the inventive features or functions of devices provided by the present invention.

As shown in FIG. 1, secondary conductor 10b has been stripped of its electrical insulated covering ("insulation" for short) while the other secondary conductor 10a is still covered with electrical insulation except for an end 100a where bare conductor beyond the termination of the insulation can be seen (i.e., the dark-colored portion). For the sake of completeness, an end 100b of secondary conductor 10b is also identified in FIG. 1.

Referring now to FIGS. 2a through 2d there is depicted different views of a device 2 for protecting conductors according to embodiments of the invention. The device 2 may be an insulated splitter, for example, made from a polyvinyl chloride (PVC) based material, for example. As shown in a cross sectional view (see FIG. 2b), device 2 may include an insulated main passageway 20a comprising an undivided chamber 20d, smooth and chamfered internal surfaces 40 and smooth and chamfered radii of opening 30a (see FIG. 2d) that allows passage of a main medium, such as cable 1 in FIG. 1, and its internal secondary conductive media (e.g., media 10a, 10b). Device 2 may further include at least two, insulated and separated secondary passageways 20b, 20c each having smooth and chamfered internal surfaces 40. In one embodiment, one of the secondary passageways 20b may be configured as a tubular passageway. Each of the separate secondary passageways 20b, 20c forms a separate, unitary passageway with the chamber 20d of the main passageway 20a to allow passage of at least one of the secondary, conductors 10a, 10b.

In the embodiments depicted in FIGS. 2a through 2d, secondary passageway 20b is configured as a tubular passageway while passageway 20c is not configured as an elongated passageway. That is, in one embodiment only one of the secondary passageways is configured as an elongated passageway. In other embodiments, both, all or none of the secondary passageways may be configured as elongated passageways.

Though device 2 is configured to allow more than one secondary conductor (e.g., copper conductor) to pass through a main passageway and one secondary passageway it should be understood that devices provided by the present invention also allow a single secondary conductor or a single main medium to pass through a main passageway and secondary passageway. Further, it should be understood that the device 2 may be a reusable device (e.g. splitter). That is, the device 2 may be first used to cover or otherwise protect a first medium (e.g., cable, conductors) and then removed when appropriate and re-used to cover or otherwise protect another medium.

Continuing, an elongated passageway provides the advantage of substantially covering the entirety of an uninsulated (stripped) conductor, such as conductor 10b in FIG. 1 in order to protect the conductor 10b, any connected or nearby device, as well as any service personnel. Secondary passageway 20b may be configured to form a separate, unitary passageway with the chamber 20d of the main passageway 20a to allow passage of at least one uninsulated secondary conductor, such as conductor 10b, or more generally, passage of at least one elongated secondary medium. That leaves passageway 20c for passing insulated, secondary conductor 10a. More particularly, as shown secondary passageway 20c may be configured to form a separate, unitary (e.g., not elongated), passageway with the chamber 20d of the main passageway 20a to allow passage of the insulated, secondary conductor 10a, or more generally, of at least one elongated secondary medium.

It should be understood that the words "main" and "secondary" are designations used to visually distinguish a cable from its internal component conductors or to distinguish an undivided passageway from separated passageways. These designations do not connote any degree of relative importance, usage or electrical characteristics. Other designations may be used without departing from the scope of the present invention.

While device 2 depicts the use of two secondary passageways, this is exemplary. Further, while FIGS. 2a through 2d depict the elongated passageway 20b shaped as a tubular passageway, other shapes may be used Yet further, the cross sectional shape of the elongated passageway 20b may be square, rectangular or oval, to name just a few examples.

Because device 2 maintains a separation or "split" between the conductors 10a, 10b the device 2 is sometimes referred to as a "splitter".

Figure 2A:
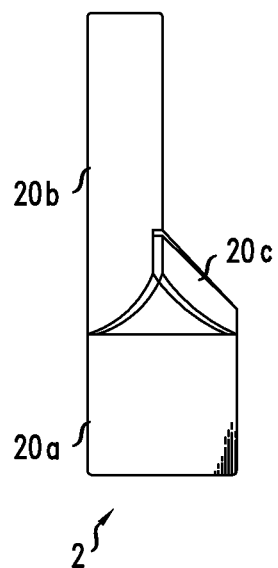
FIGS. 2a through 2d depict different views of an exemplary device according to an embodiment of the present invention.
Figure 2B:
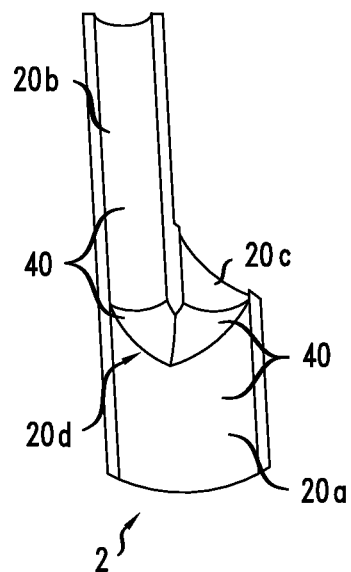
Figure 2C:
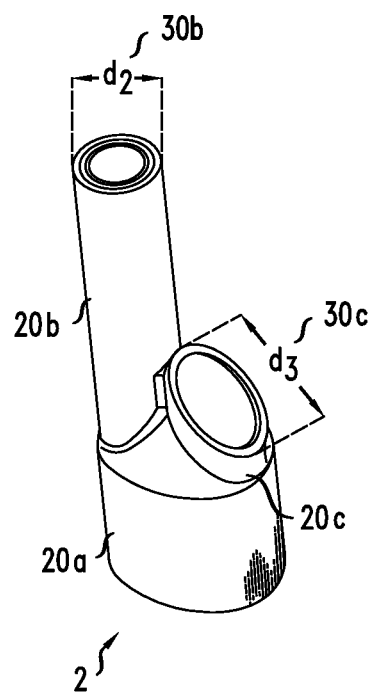
Figure 2D:
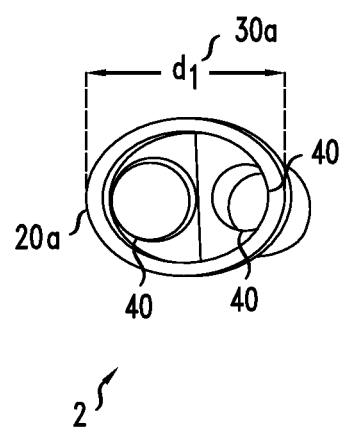

As seen in FIGS. 2c and 2d each of the passageways 20a, 20b and 20c has an opening. For example, main passageway 20a has an opening 30a (see FIG. 2d), secondary passageway 20b has an opening 30b and secondary passageway 20c has an opening 30c (see FIG. 2c). It should be understood that the shapes and sizes of the openings 30a, 30b and 30c shown in the figures herein are merely illustrative. Further, the shape and size of an opening 30a, 30b and 30c may vary based on the shape and dimensions of a secondary conductor(s) and cable, for example.

Each of the openings has and smooth and chamfered radii, and is associated with a diameter $d_1$, $d_2$ or $d_3$ respectively. In one embodiment the diameter of each of the openings 30b, 30c in the secondary passageways 20b, 20c may be different. For example, the diameter $d_2$ of the opening 30b of secondary passageway 20b may not be the same as the diameter $d_3$ of the opening 30c of secondary passageway 20c. In yet another embodiment, the diameters of each opening in each of the secondary passageways may be the same. Still further, if an exemplary device includes more than two secondary passageways than the device may include secondary passageways that comprise a combination of similar and dissimilar diameters for openings in such secondary passageways.

As noted above, the main passageway 20a also includes an opening 30a having a diameter $d_1$. In one embodiment, the diameter $d_1$ of the opening 30a of the main passageway 20a may be equal to, or greater than, a total diameter (i.e., $d_2$ plus $d_3$) of both openings 30b, 30c in the secondary insulated passageways 20b, 20c. However, in another embodiment the diameter $d_1$ of an opening of the main, insulated passageway 20a may be less than a total diameter (i.e., $d_2$ plus $d_3$) of both openings 30b, 30c in the separated secondary insulated passageways 20b, 20c. The latter may occur, for example, when one of the openings of a secondary passageway is shaped as an elongated ellipse, for example.

Figure 3:
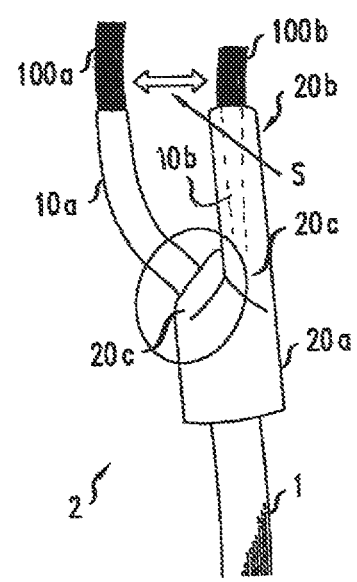
FIG. 3 depicts an exemplary device according to an embodiment of the present invention.

FIG. 3 depicts an exemplary device 2 covering a medium 1 (e.g., a cable) according to an embodiment of the present invention. As depicted the elongated passageway 20b allows an uninsulated conductor to pass through while the other (not elongated) passageway 20c allows an insulated conductor to pass through. In one embodiment, a spacing "S" between the conductors 10a, 10b (conductor 10b shown in phantom within elongated passageway 20b) may be varied by, for example, varying the position of the device 2 and/or lengths of the conductors 10a, 10b and/or lengths of the secondary passageways 20b, 20c. The spacing "S" should be selected to ensure that uninsulated portions 100a, 100b of the conductors 10a, 10b do not touch one another.

Figure 4:
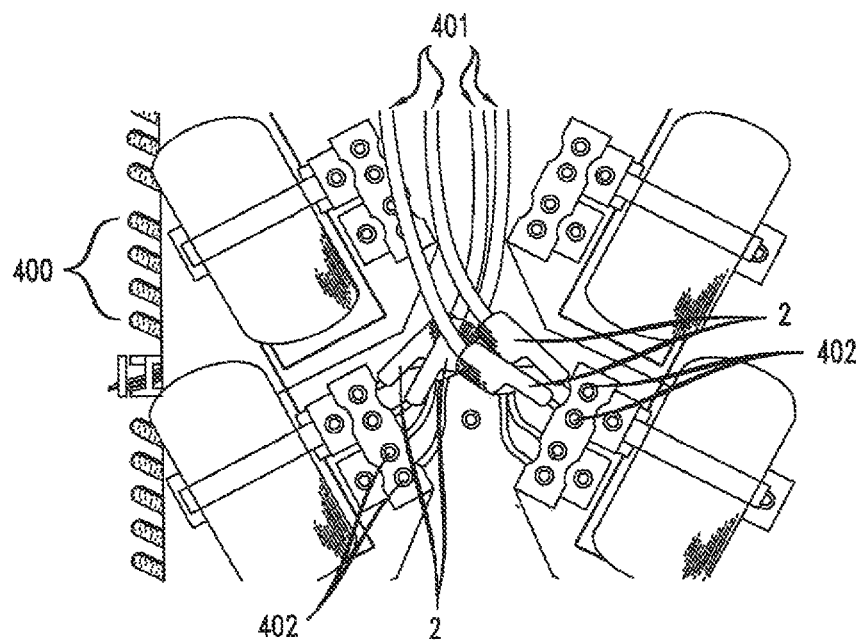
FIGS. 4 and 5 depict an exemplary device used in a wireless base station system according to embodiments of the present invention.
Figure 5:
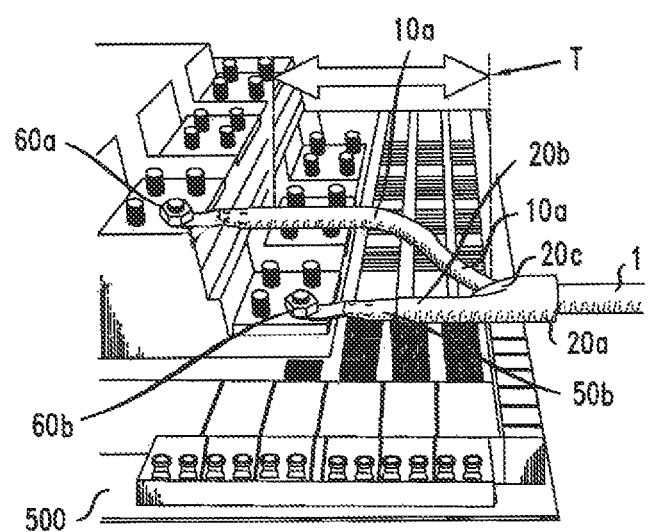

FIGS. 4 and 5 depict an exemplary device 2 (e.g., insulated splitter) used in a wireless base station system according to embodiments of the present invention. In FIG. 4 exemplary devices 2 are shown being used inside of an electrical junction box 400 typically located on top of a base station antenna tower, for example. Four DC low inductance, multi-conductor power cables 401 are shown used with associated inventive splitters 2 (i.e., one splitter per cable). As can be seen in FIG. 4, each splitter 2 protects two internal secondary conductors of a main cable 401. In particular, each splitter 2 protects (e.g. insulates) an uninsulated, secondary conductor. By protecting the secondary conductors the splitters 2 prevent electrical shorts that might otherwise occur if unprotected conductors made contact with one another. Further, the splitters 2 allow insulated secondary conductors to have the freedom/flexibility to be formed (e.g., bent) into a shape to fit into an electrical lug 402.

In FIG. 5 a single DC, low inductance power cable 1 and its two secondary conductors are shown installed in a rack-mounted electrical junction box 500 (typically located on the ground of a wireless base station) along with a splitter 2. The splitter 2 protects (e.g., insulates) an uninsulated conductor within a passageway 20b all the way to an electrical lug 60b. The inventive splitter 2 allows an insulated secondary conductor 10a to be protected by passageway 20c and to be easily connected to an electrical lug 60a.

In one embodiment, one or more of the openings in a secondary insulated passageway, such as passageway 20b shown in FIG. 5, may comprise a deformable opening to allow for the connection of a crimp on connector 50b or another type of connector. Further, one or more (e.g. all) of the passageways 20a, 20b and 20c may be trimmable. That is, in one embodiment the main passageway 20a and secondary passageways 20b, 20c may be made from a material that allows the passageways to be trimmed or cut to a desired length, represented by the letter "T" in FIG. 5 while still providing the protections described herein.

In addition to providing exemplary devices, the present invention also provides related, exemplary methods. For example, one such method may comprise protecting elongated, media. Such a method may comprise, for example, inserting a main, elongated medium, such as cable 1, into a main passageway of a device, such as an insulated splitter, where the splitter may include an undivided chamber, smooth and chamfered surfaces and smooth and chamfered radii for all openings. As described herein, the main medium may include at least two internal secondary elongated conductive media, such as secondary conductors 10a and 10b. As before, the main medium may comprise a low inductance, multi-conductor DC power cable, while the secondary conductors may comprise copper wire, either solid or stranded copper wire of a number of gauges, for example. It should be understood that the secondary conductors may be made from other conductive material, such as aluminum, for example.

Continuing, when a main medium is inserted into a main chamber of a main passageway, two internal secondary conductive media are similarly inserted.

Thereafter, the method may further comprise separating the at least two internal secondary elongated conductive media, where at least one of the separated secondary elongated conductive media passes through the undivided chamber and into a secondary passageway configured as an elongated (e.g., tubular) passageway of the splitter, and at least one of the separated secondary elongated conductive media passes through the undivided chamber and into another secondary (not elongated, for example) passageway of the splitter.

Prior to insertion of the secondary conductive media into the main passageway of the splitter, the method may further include the removal of insulation from around one of the separated secondary conductive media, inserting the separated secondary conductive media into the main passageway, and then passing the secondary conductive medium with its insulation removed through the undivided chamber and into the secondary passageway configured as the elongated passageway of the splitter, and then (assuming there is at least two secondary conductors) passing the other secondary conductor through another passageway of the splitter.

Although exemplary devices and methods have been described and illustrated, it should be understood that the specific features or components shown in such exemplary devices and explained in exemplary methods may be modified in order to be compatible with alternate applications without departing from the scope of the present invention.

In sum, while exemplary embodiments have been shown and described herein, it should be understood that variations of the disclosed embodiments may be made without departing from the scope of the claims that follow.

We claim:

1. A device for protecting electrical conductors comprising:
   a unitary covering that includes:
      a main passageway comprising an undivided chamber having a smooth internal surface and an opening to allow passage of a main, elongated conductive medium; and
      at least first and second, secondary passageways each having a smooth internal surface, wherein the first secondary passageway comprises a tubular passageway elongated with respect to the second secondary passageway, and each of the secondary passageways forms a respective separate, unitary passageway from the undivided chamber to allow passage of at least one of the secondary conductive media.

2. The device as in claim 1 wherein the first secondary passageway has a smaller diameter than the second secondary passageway.

3. The device as in claim 1 wherein the device is reusable.

4. The device as in claim 1 wherein the device comprises a polyvinyl chloride (PVC) based material.

5. The device as in claim 1 wherein the main passageway and the first and second secondary passageways form a single, undivided structure.

6. The device as in claim 1, further comprising a cable having an insulated first conductor and an uninsulated second conductor, wherein said first conductor is routed through said second secondary passageway, and said second conductor is routed through said first secondary passageway.

7. A device for protecting electrical conductors comprising:
   a main passageway comprising an undivided chamber having smooth internal surfaces and a smooth and chamfered opening to allow passage of a cable comprising at least two conductors; and
   two secondary insulated passageways each having smooth internal surfaces, where one of the secondary passageways is elongated with respect to the other secondary passageway, and each of the secondary passageways forms a separate, unitary passageway with the undivided chamber of the main passageway to allow passage of at least one of the conductors.

8. The device as in claim 7 wherein the elongated secondary passageway is further configured to form a separate, unitary passageway with the undivided chamber of the main passageway to allow passage of a first one of said conductors.

9. The device as in claim 8 wherein the other secondary passageway has a smaller diameter than said elongated secondary passageway and forms a separate, unitary passageway with the undivided chamber of the main passageway to allow passage of a second one of said conductors.

10. The device as in claim 7 wherein the device is reusable.

11. The device as in claim 7 wherein the device comprises a polyvinyl chloride (PVC) based material.

12. The device as in claim 7 wherein the device is formed as a single piece.

13. The device as in claim 7 wherein the elongated passageway is configured to substantially cover one of the conductors.

14. A method for protecting electrical conductors comprising:
   inserting a main, elongated conductive medium comprising at least two secondary conductive media into a main passageway of a splitter comprising an undivided chamber having a smooth internal surface and an opening, and having at least first and second separate secondary passageways each having a smooth internal surface, the first secondary passageway comprising a tubular passageway elongated with respect to the second secondary passageway, and each of the secondary passageways forming a respective separate, unitary passageway from the undivided chamber to allow passage of at least one of the secondary conductive media; and
   passing the secondary conductive media through the undivided chamber such that an uninsulated one of the secondary conductive media passes through the first secondary passageway, and an insulated one of the secondary conductive media passes through the second secondary passageway.

15. The method as in claim 14 further comprising:
   removing insulation from around the first secondary conductive media; and
   separating the first secondary conductive media and the second secondary conductive media.

16. The method as in claim 14 wherein the main passageway and the first and second secondary passageways form a single, undivided structure.

\* \* \* \* \*

UNITED STATES PATENT AND TRADEMARK OFFICE
CERTIFICATE OF CORRECTION

PATENT NO. : 9,627,876 B2
APPLICATION NO. : 14/664274
DATED : April 18, 2017
INVENTOR(S) : Triggs et al.

Page 1 of 1

It is certified that error appears in the above-identified patent and that said Letters Patent is hereby corrected as shown below:

In the Claims

Column 7, Line 46, cancel the text beginning with "1. A device for protecting" to and ending "secondary conductive media" in Column 7, Line 61, and insert the following claim:

--1. A device for protecting electrical conductors comprising:
a unitary covering that includes:
a main passageway comprising an undivided chamber having a smooth internal surface and an opening to allow passage of a main, elongated conductive medium; and
at least first and second, secondary passageways each having a smooth internal surface, wherein the first secondary passageway comprises a tubular passageway elongated with respect to the second secondary passageway, and each of the secondary passageways forms a respective separate, unitary passageway from the undivided chamber to allow passage of at least one secondary conductive media.--

Signed and Sealed this
Twenty-first Day of November, 2017

Joseph Matal
*Performing the Functions and Duties of the
Under Secretary of Commerce for Intellectual Property and
Director of the United States Patent and Trademark Office*